United States Patent
Kook et al.

(10) Patent No.: US 11,480,246 B2
(45) Date of Patent: Oct. 25, 2022

(54) CONTROL DEVICE OF MULTI-STAGE TRANSMISSION FOR ELECTRIC VEHICLE AND CONTROL METHOD THEREFOR

(71) Applicants: Hyundai Motor Company, Seoul (KR); Kia Motors Corporation, Seoul (KR)

(72) Inventors: Jae Chang Kook, Hwaseong-si (KR); Dong Hoon Jeong, Hwaseong-si (KR); Byeong Wook Jeon, Seoul (KR); Kwang Hee Park, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 305 days.

(21) Appl. No.: 16/938,445

(22) Filed: Jul. 24, 2020

(65) Prior Publication Data
US 2021/0180687 A1    Jun. 17, 2021

(30) Foreign Application Priority Data
Dec. 16, 2019  (KR) .................. 10-2019-0167630

(51) Int. Cl.
| *F16H 61/02* | (2006.01) |
| *F16H 59/70* | (2006.01) |
| *F16H 59/14* | (2006.01) |
| *F16H 59/44* | (2006.01) |
| *F16H 59/50* | (2006.01) |
| *F16H 59/18* | (2006.01) |

(52) U.S. Cl.
CPC ......... *F16H 61/0213* (2013.01); *F16H 59/18* (2013.01); *F16H 59/44* (2013.01); *F16H 59/50* (2013.01); *F16H 59/70* (2013.01); *F16H 2059/147* (2013.01); *F16H 2306/20* (2013.01)

(58) Field of Classification Search
CPC .......... F16H 59/18; F16H 59/44; F16H 59/50; F16H 59/70; F16H 2059/147; F16H 61/0213; F16H 61/08; F16H 2306/20
See application file for complete search history.

(56) References Cited

U.S. PATENT DOCUMENTS

| 9,593,767 | B2 | 3/2017 | Tsukizaki et al. | |
| 2010/0168946 | A1* | 7/2010 | Snyder | H02P 6/182 701/22 |
| 2013/0131903 | A1* | 5/2013 | Araki | B60W 30/20 903/930 |
| 2014/0121874 | A1 | 5/2014 | Kim | |
| 2015/0051765 | A1* | 2/2015 | Ryu | B60W 20/10 903/902 |
| 2017/0166208 | A1 | 6/2017 | Park et al. | |

FOREIGN PATENT DOCUMENTS

| KR | 101786126 B1 | 10/2017 |
| KR | 101786241 B1 | 10/2017 |

* cited by examiner

*Primary Examiner* — Edwin A Young
(74) *Attorney, Agent, or Firm* — Slater Matsil, LLP (57) ABSTRACT

A control device for a multi-stage transmission for an electric vehicle is provided. The control device includes a controller configured to calculate a driving force of a drive motor when entering a shift mode and to determine a shift time point based on the calculated driving force, and the multi-stage transmission configured to perform shifting at the determined shift time point.

20 Claims, 9 Drawing Sheets

CONTROL DEVICE OF MULTI-STAGE TRANSMISSION FOR ELECTRIC VEHICLE AND CONTROL METHOD THEREFOR

CROSS-REFERENCE TO RELATED APPLICATION

This application claims the benefit of Korean Patent Application No. 10-2019-0167630, filed in the Korean Intellectual Property Office on Dec. 16, 2019, which application is hereby incorporated herein by reference.

TECHNICAL FIELD

The present disclosure relates to a control device of a multi-stage transmission for an electric vehicle and a control method therefor.

BACKGROUND

Generally, an electric vehicle is equipped with a drive motor to drive by a driving force output from the drive motor.

The drive motor has relatively excellent characteristics of torque output from a low-speed section to a high-speed section. Therefore, the electric vehicle is able to drive by adjusting the speed and torque of the drive motor, but when a transmission is installed, the electric vehicle achieves excellent driving force performance compared to the size and capacity of the drive motor.

Accordingly, the electric vehicle is equipped with a transmission capable of adjusting a torque and a speed in a process of transferring a driving force from the drive motor to drive wheels. In this case, the electric vehicle includes a transmission equipped with a shift gear having a relatively small size unlike a transmission of an internal combustion engine, minimizing an increase in weight and cost due to mounting of the transmission, and securing driving force performance equivalent to that of an internal combustion engine vehicle while reducing the size and capacity of the drive motor.

A multi-stage transmission mounted on an internal combustion engine has characteristics in which the driving force of the drive motor always decreases regardless of the speed of the vehicle in upshift and the driving force of the drive motor always increases regardless of the vehicle speed in downshift, but a transmission of the electric vehicle has characteristics that the driving force of the drive motor increases or decreases according to a speed of the electric vehicle in the upshift and the driving force of the drive motor increases or decreases according to a speed of the electric vehicle in the downshift.

Conventional technology for controlling a multi-stage transmission for an electric vehicle has a problem in that it is impossible to secure sufficient feeling of acceleration and feeling of stable shifting because the shifting of the multi-stage transmission is controlled without considering characteristics that the driving force of the drive motor increases or decreases according to the speed of the electric vehicle.

The above information disclosed in this Background section is only to enhance the understanding of the background of the disclosure and therefore it may contain information that does not form the prior art that is already known to a person of ordinary skill in the art.

SUMMARY

The present disclosure can solve problems occurring in the prior art while advantages achieved by the prior art are maintained intact.

The present disclosure relates to a control device of a multi-stage transmission for an electric vehicle and a control method therefor. Particular embodiments relate to a technique for adjusting a shift time point of a multi-stage transmission provided in an electric vehicle.

An aspect of the present disclosure provides a control device and a control method for a multi-stage transmission for an electric vehicle which calculates the driving force of the driving motor when entering the shift mode of the multi-stage transmission, and determines the shift time point of the multi-stage transmission based on the calculated driving force, thus securing feeling of stable shifting during upshift, and sufficient feeling of acceleration during downshift.

Features of the present disclosure are not limited to the above-mentioned features, and other features and advantages of the present disclosure which are not mentioned may be understood by the following description, and will be more clearly understood by embodiments of the present disclosure. It will also be readily apparent that the features and advantages of the disclosure may be realized by means of the instrumentalities and combinations particularly pointed out in the appended claims.

Technical problems solved by the present inventive concept are not limited to the aforementioned problems, and any other technical problems not mentioned herein will be clearly understood from the following description by those skilled in the art to which the present disclosure pertains.

According to an aspect of the present disclosure, a control device for a multi-stage transmission for an electric vehicle may include a controller that calculates a driving force of a drive motor when entering a shift mode, and determines a shift time point based on the calculated driving force, and a multi-stage transmission that performs shifting at the determined shift time point.

The controller may determine a time point at which the calculated driving force exceeds a reference value as a shift time point of the multi-stage transmission when entering a downshift mode.

The control device may further include a storage that stores a transmission pattern map of the multi-stage transmission, a vehicle speed sensor that measures a speed of the electric vehicle, and an accelerator position sensor that measures an amount of pressure on an accelerator pedal.

The controller may detect a shift gear corresponding to a vehicle speed measured by the vehicle speed sensor and a value measured by an accelerator position sensor (APS) based on the transmission pattern map, and compare the detected shift gear with a current shift gear to determine whether to enter the downshift mode.

The controller may determine a shift time point of the multi-stage transmission in consideration of the calculated driving force when entering an upshift mode.

The control device may further include a storage that stores a transmission pattern map of the multi-stage transmission, a vehicle speed sensor that measures a speed of the electric vehicle, and an APS that measures an amount of pressure on an accelerator pedal.

The controller may detect a shift gear corresponding to a vehicle speed measured by the vehicle speed sensor and a value measured by the APS based on the transmission pattern map, and compare the detected shift gear with a current shift gear to determine whether to enter an upshift mode.

According to an aspect of the present disclosure, a control method of a multi-stage transmission for an electric vehicle may include calculating a driving force of a drive motor when entering a shift mode, determining a shift time point based on the calculated driving force, and performing shifting at the determined shift time point.

The determining of the shift time point may include determining a time point at which the calculated driving force exceeds a reference value as a shift time point of the multi-stage transmission when entering a downshift mode.

The determining of the shift time point may include storing, by a storage, a transmission pattern map of a multi-stage transmission, measuring, by a vehicle speed sensor, a speed of the electric vehicle, measuring, by an APS, an amount of pressure on an accelerator pedal, detecting, by a controller, a shift gear corresponding to a vehicle speed measured by the vehicle speed sensor and a value measured by the APS based on the transmission pattern map, and, comparing, by the controller, the detected shift gear with a current shift gear to determine whether to enter a downshift mode.

The determining of the shift time point may include determining a shift time point of the multi-stage transmission in consideration of the calculated driving force when entering an upshift mode.

The determining of the shift time point may include storing, by a storage, a transmission pattern map of a multi-stage transmission, measuring, by a vehicle speed sensor, a speed of the electric vehicle, measuring, by an APS, an amount of pressure on an accelerator pedal, detecting, by a controller, a shift gear corresponding to a vehicle speed measured by the vehicle speed sensor and a value measured by the APS based on the shift pattern map, and comparing, by the controller, the detected shift gear with a current shift gear to determine whether to enter an upshift mode.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
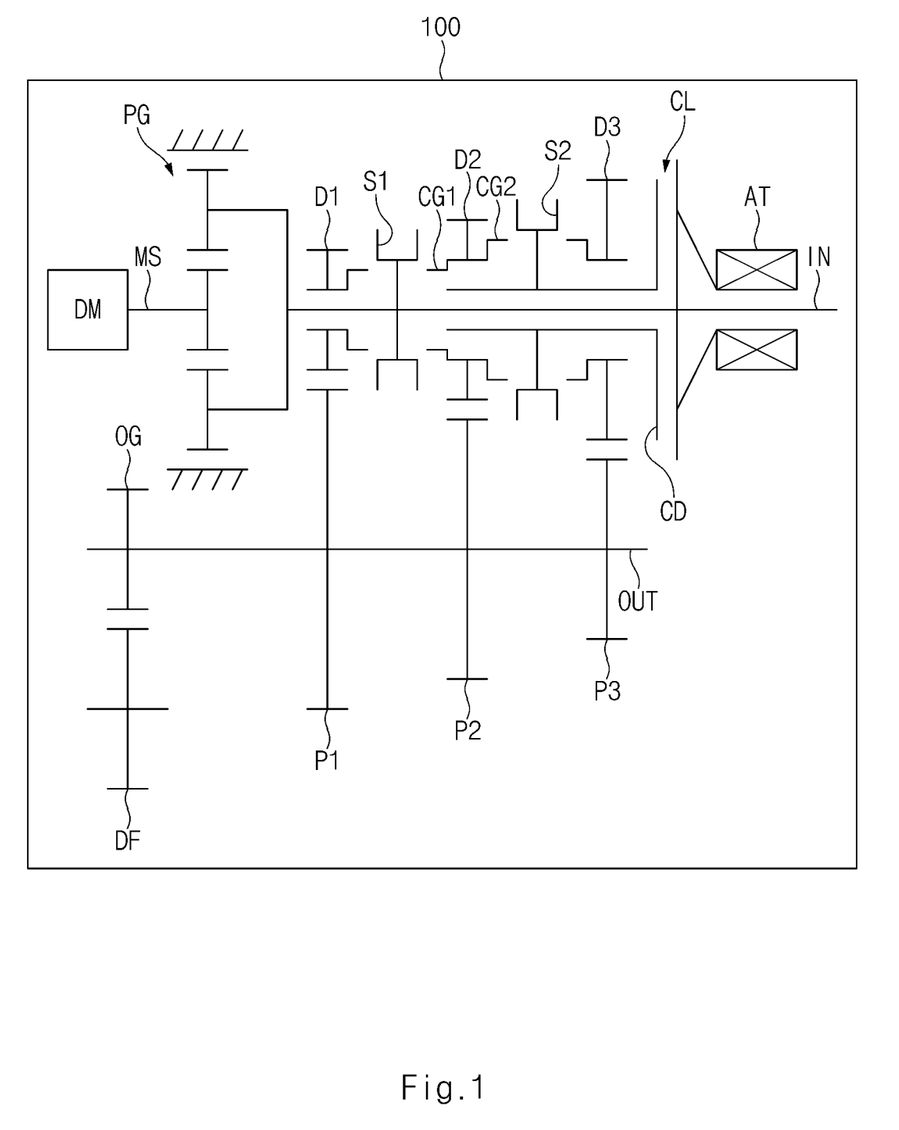
FIG. 1 is an exemplary view showing a structure of a multi-stage transmission for an electric vehicle to which an embodiment of the present disclosure is applied.

FIG. 1 is an exemplary view showing a structure of a multi-stage transmission for an electric vehicle to which an embodiment of the present disclosure is applied.

As shown in FIG. 1, a multi-stage transmission 100 for an electric vehicle to which an embodiment of the present disclosure is applied may include a concentric reducer that receives a driving force from a drive motor shaft MS, performs reduction on the driving force, and outputs the driving force to an input shaft IN concentric with the drive motor shaft MS, an output shaft OUT disposed in parallel to the input shaft IN, a hollow shaft installed to be relatively rotatable to the input shaft IN, a clutch device installed to switch a state of transferring the driving force of the input shaft IN to the hollow shaft, a first synchronous device S1 with a hub fixed to the input shaft IN, a second synchronous device S2 with a hub fixed to the hollow shaft, a plurality of driving gears installed on the input shaft IN and the hollow shaft and having different sizes to be coupled with at least one of the first synchronous device S1 and the second synchronous device S2, and a plurality of driving gears installed on the output shaft OUT to engage with a plurality of driven gears to form different transmission ratios.

The output shaft OUT is integrally provided with an output gear OG connected to a differential DF such that power transmitted from the input shaft IN is distributed to both drive wheels through the differential DF.

The concentric reducer may be composed of a single pinion planetary gear device (PG) in which the ring gear is always fixed. More specifically, the power of the drive motor DM may be input to the drive motor shaft MS connected to a sun gear of the planetary gear device PG, and decelerated through the input shaft IN connected to a carrier to be output.

Of course, even when the sun gear of the planetary gear device PG is fixed and the drive motor shaft MS is connected to the ring gear, a configuration of decelerating and outputting power of the drive motor DM through the input shaft IN connected to the carrier may be implemented.

The plurality of driving gears may be composed of a first-stage driving gear D1 installed to be coupled to the first synchronous device S1, a second driving gear D2 installed to be coupled to the first synchronous device S1 and the second synchronous device S2 and a third driving gear D3 installed to be coupled to the second synchronous device S2.

That is, a first clutch gear CG1 to engage with a sleeve of the first synchronous device S1 may be integrally provided at one side of the second driving gear D2, and a second clutch gear CG2 to engage with a sleeve of the second synchronous device S2 may be integrally provided at the other side of the second driving gear D2, so that the second driving gear D2 may also be coupled to the first synchronous device S1 and also to the second synchronous device S2.

Of course, a plurality of driven gears of the output shaft OUT may be composed of a first driven gear P1 to engage with the first-stage driving gear D1 to form the largest first-stage transmission ratio, a second driven gear P2 to engage with the second driving gear D2 to form a second-stage transmission ratio, and a third driven gear P3 to engage with the third driving gear D3 to form the smallest third-stage transmission ratio P3.

The clutch device may include a friction clutch CL configured to receive a linear displacement along the axial direction of the input shaft IN from the outside and change the frictional force generated on a clutch disc installed in the hollow shaft in proportion to the linear displacement and an actuator AT installed to provide a linear displacement along the axial direction of the input shaft IN to the friction clutch CL.

Figure 2A:
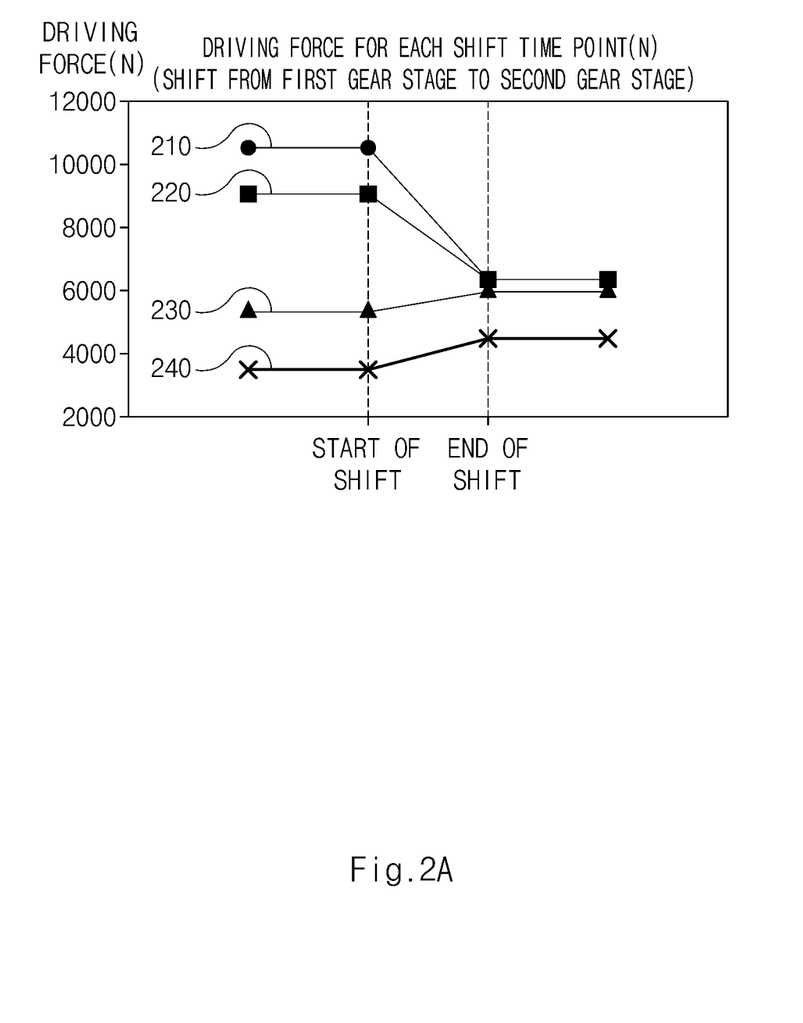
FIG. 2A is a view showing up-shift characteristics of a multi-stage transmission for an electric vehicle to which an embodiment of the present disclosure is applied.

FIG. 2A is a view showing up-shift characteristics of a multi-stage transmission for an electric vehicle to which an embodiment of the present disclosure is applied.

As shown in FIG. 2A, a vertical axis represents a driving force and a horizontal axis represents a shift start time point and a shift end time point.

In addition, '210' represents a change in the driving force of the drive motor DM in the upshift from the first gear stage to the second gear stage in a state in which a vehicle speed (a speed of an electric vehicle) is 10 KPH, '220' represents a change in the driving force of the drive motor DM in the upshift from the first gear stage to the second gear stage in a state in which a vehicle speed is 20 KPH, '230' represents a change in the driving force of the drive motor DM in the upshift from the first gear stage to the second gear stage in a state in which a vehicle speed is 30 KPH, and '240' represents a change in the driving force of the drive motor DM in the upshift from the first gear stage to the second gear stage in a state in which a vehicle speed is 40 KPH.

When the vehicle speed is 10 KPH and 20 KPH, the driving force of the drive motor DM decreases during the upshift, and when the vehicle speed is 30 KPH and 40 KPH, the driving force of the drive motor DM increases during the upshift.

Through this, it can be seen that the driving force of the drive motor DM increases or decreases based on the vehicle speed during the upshift in the multi-stage transmission 100 for the electric vehicle.

Figure 2B:
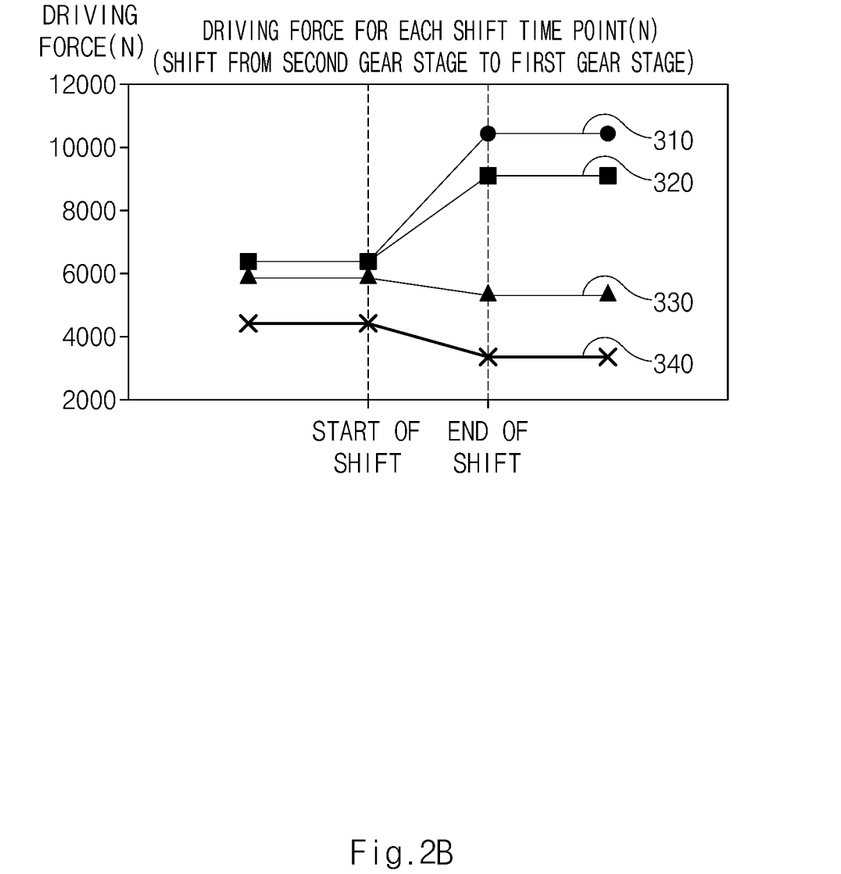
FIG. 2B is a view showing down-shift characteristics of a multi-stage transmission for an electric vehicle to which an embodiment of the present disclosure is applied.

FIG. 2B is a view showing down-shift characteristics of a multi-stage transmission for an electric vehicle to which an embodiment of the present disclosure is applied.

As shown in FIG. 2B, a vertical axis represents a driving force and a horizontal axis represents a shift start time point and a shift end time point.

In addition, '310' represents a change in the driving force of the drive motor DM in downshift from the second gear stage to the first gear stage in a state in which a vehicle speed (a speed of an electric vehicle) is 10 KPH, '320' represents a change in the driving force of the drive motor DM in the downshift from the second gear stage to the first gear stage in a state in which a vehicle speed is 20 KPH, '330' represents a change in the driving force of the drive motor DM in the downshift from the second gear stage to the first gear stage in a state in which a vehicle speed is 30 KPH, and '340' represents a change in the driving force of the drive motor DM in the downshift from the second gear stage to the first gear stage in a state in which a vehicle speed is 40 KPH.

When the vehicle speed is 10 KPH and 20 KPH, the driving force of the drive motor DM may increase during the downshift, and when the vehicle speed is 30 KPH and 40 KPH, the driving force of the drive motor DM may decrease during the downshift.

Through this, it can be seen that the driving force of the drive motor DM increases or decreases based on the vehicle speed during the downshift in the multi-stage transmission 100 for the electric vehicle.

Figure 3:
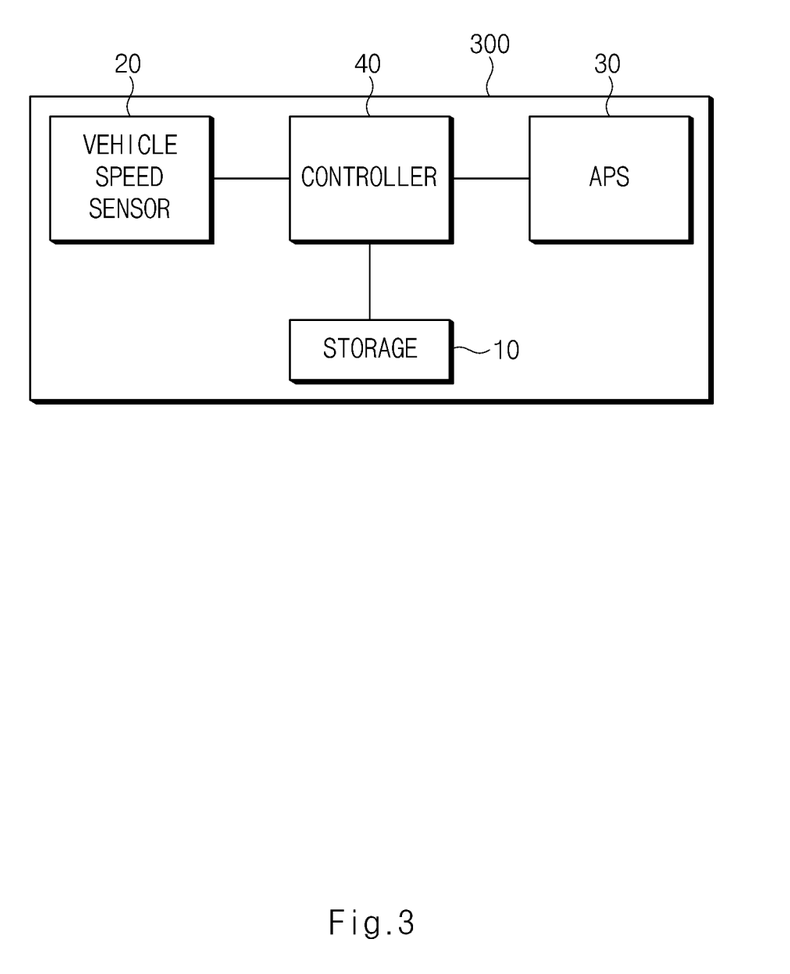
FIG. 3 is a configuration diagram of a control device for a multi-stage transmission for an electric vehicle according to an embodiment of the present disclosure.

FIG. 3 is a configuration diagram of a control device for a multi-stage transmission for an electric vehicle according to an embodiment of the present disclosure.

As shown in FIG. 3, a control device 300 of a multi-stage transmission for an electric vehicle according to an embodiment of the present disclosure may include storage 10, a vehicle speed sensor 20, an Accelerator Positon Sensor (APS) 30, and a controller 40. In this case, according to a method of implementing the control device 300 for the multi-stage transmission for the electric vehicle according to an embodiment of the present disclosure, the components may be combined with each other as one entity, or some components may be omitted.

The components will be described. First, the storage 10 may store various logics, algorithms, and programs required in a process of calculating a driving force of the drive motor DM when entering a shift mode of the multi-stage transmission 100, and determining a shift time point of the multi-stage transmission 100 based on the calculated driving force.

The storage 10 may store various logics, algorithms, and programs required in a process of calculating a driving force of the drive motor DM when entering a downshift mode of the multi-stage transmission 100, and determining a time point at which the calculated driving force exceeds a reference value (e.g., zero) as a shift time point of the multi-stage transmission 100.

The storage 10 may store various logics, algorithms, and programs required in a process of calculating a driving force of the drive motor DM when entering an upshift mode of the multi-stage transmission 100, and determining a time point at which the calculated driving force is less than a reference value (e.g., zero) as a shift time point of the multi-stage transmission 100.

The storage 10 may store a transmission pattern map used to determine whether the multi-stage transmission 100 enters a shift mode. In this case, the transmission pattern map is shown in FIG. 4 as an example.

Figure 4:
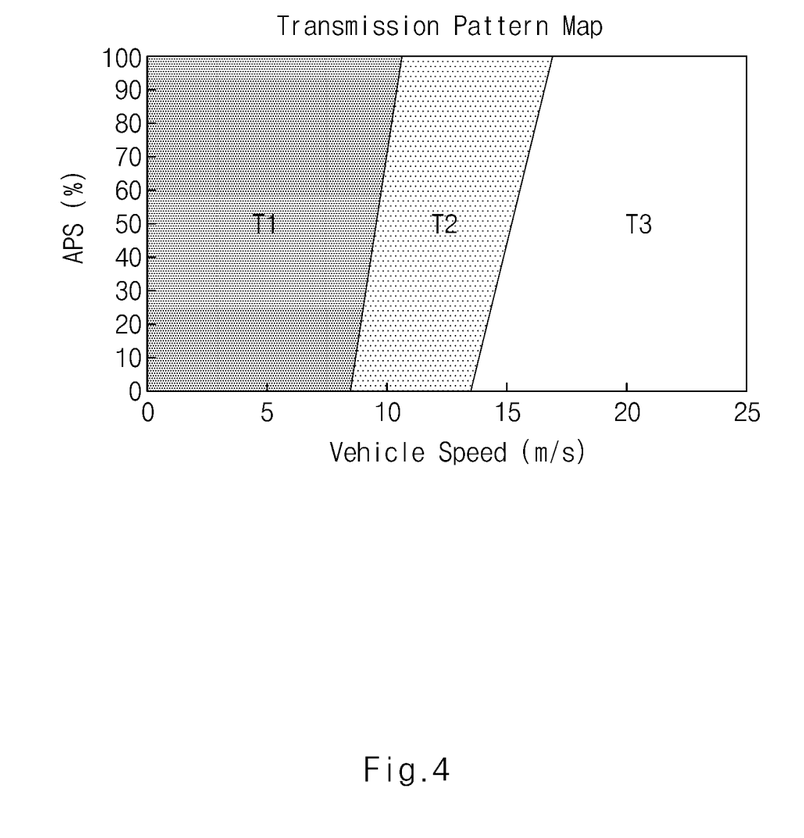
FIG. 4 is a view showing a transmission pattern map provided in a control device of a multi-stage transmission for an electric vehicle according to an embodiment of the present disclosure.

FIG. 4 is a view showing a transmission pattern map provided in a control device of a multi-stage transmission for an electric vehicle according to an embodiment of the present disclosure.

As shown in FIG. 4, a vertical axis of the transmission pattern map represents an APS value, a horizontal axis represents a vehicle speed, T1 represents a region where a shift gear maintains the first gear stage, T2 represents a region where the shift gear maintains the second gear stage, and T3 represents a region where the shift gear maintains the third gear stage.

The storage 10 may store a shift determination map used to determine a shift time point of the multi-stage transmission 100. In this case, the shift determination map may include a downshift determination map and an upshift determination map, which are shown in FIGS. 5A and 5B as an example.

Figure 5A:
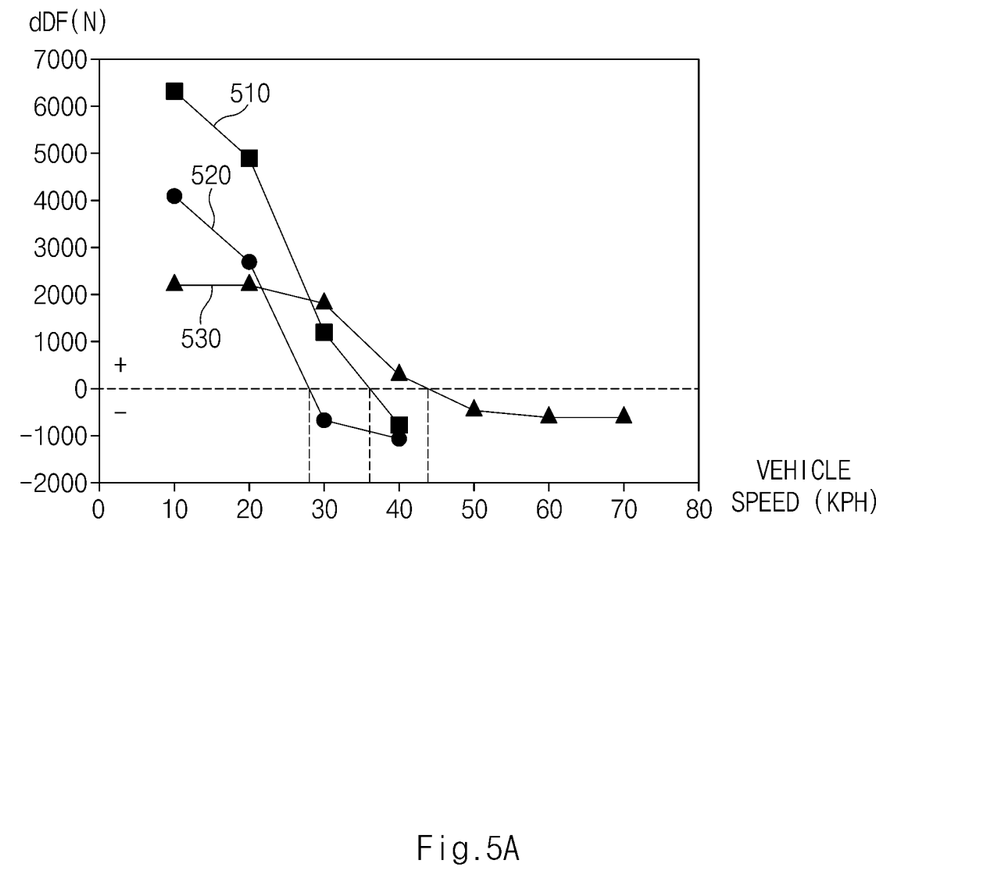
FIG. 5A is a view showing a down-shift determination map provided in a control device of a multi-stage transmission for an electric vehicle according to an embodiment of the present disclosure.

FIG. 5A is a view showing a down-shift determination map provided in a control device of a multi-stage transmission for an electric vehicle according to an embodiment of the present disclosure.

As shown in FIG. 5A, the vertical axis of the down-shift determination map represents the driving force dDF of the drive motor DM, the horizontal axis represents the vehicle speed, '510' represents a graph of a driving force of the drive motor DM according to a vehicle speed in the downshift from the third gear stage to the first gear stage, '520' represents a graph of a driving force of the drive motor DM according to a vehicle speed in the downshift from the second gear stage to the first stage and '530' represents a graph of a driving force of the drive motor DM according to a vehicle speed in the downshift from the third gear stage to the second gear stage.

Figure 5B:
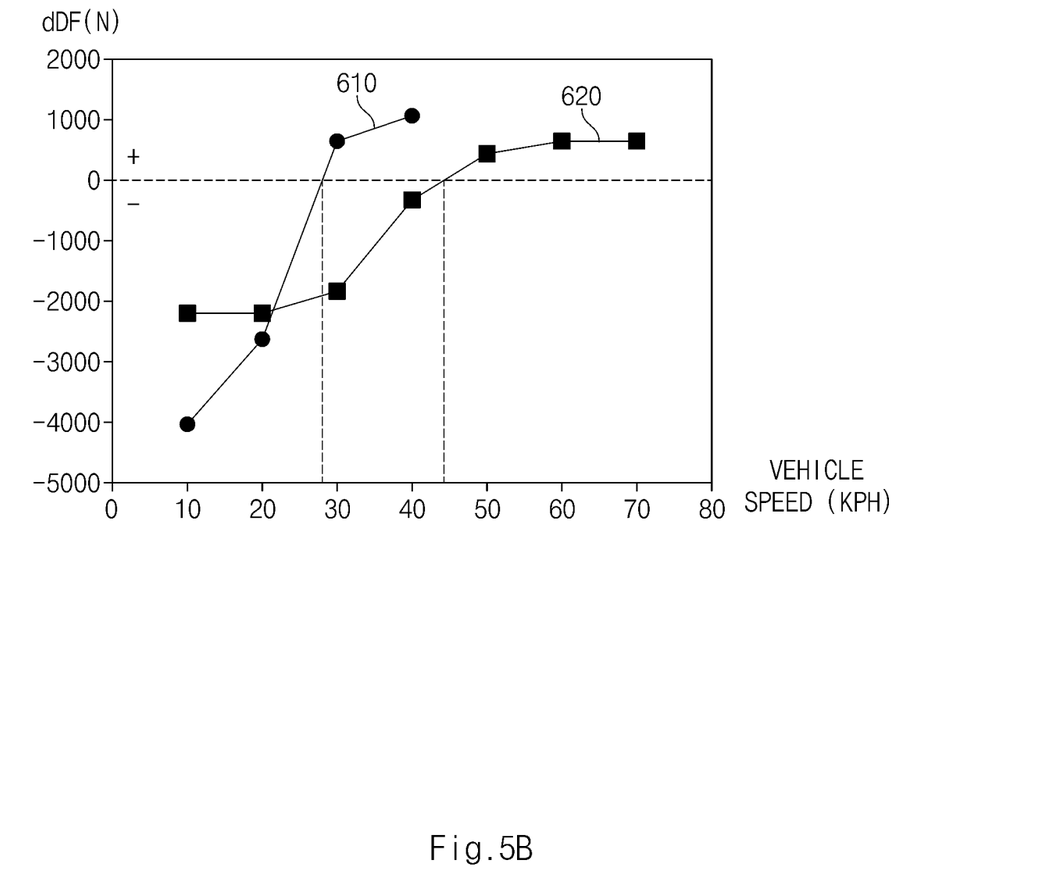
FIG. 5B is a view showing an up-shift determination map provided in the control device of a multi-stage transmission for an electric vehicle according to an embodiment of the present disclosure.

FIG. 5B is a view showing an up-shift determination map provided in the control device of a multi-stage transmission for an electric vehicle according to an embodiment of the present disclosure.

As shown in FIG. 5B, the vertical axis of the downshift determination map represents the driving force dDF of the drive motor DM, the horizontal axis represents the vehicle speed, '610' represents a graph of a driving force of the drive motor DM according to a vehicle speed in the upshift from the first gear stage to the second gear stage, and '620' represents a graph of a driving force of the drive motor DM according to a vehicle speed in the upshift from the second gear stage to the third gear stage.

The storage 10 may include at least one type of storage medium of a flash memory type, a hard disk type, a micro type, and a card type (e.g., an Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic Memory (MRAM), a magnetic disk, and an optical disk type of memory.

The vehicle speed sensor 20 may measure the speed of the electric vehicle. Although a configuration for measuring the speed of an electric vehicle using the vehicle speed sensor 20 has been described in an embodiment of the present disclosure, it may be implemented that the controller 40 directly collects vehicle speed information through a vehicle network. Herein, the vehicle network may include a controller area network (CAN), a local interconnect network (LIN), a FlexRay, a media oriented systems transport (MOST), an Ethernet, and the like.

The APS 30 may be a sensor that measures the amount (position) of pressure of an accelerator pedal. When a measured value of the APS 30 is 100%, it may mean that a driver has pressed the accelerator pedal to the maximum, and 0% may mean that the driver has not pressed the accelerator pedal at all.

The controller 40 may perform overall control such that each of the above components normally performs its function. The controller 40 may be implemented in the form of hardware or software, or may be implemented in a combination of hardware and software. Preferably, the controller 40 may be implemented with a microprocessor, but is not limited thereto.

In particular, the controller 40 may perform a variety of controls required in a process of calculating a driving force of the drive motor DM when entering a shift mode of the multi-stage transmission 100, and determining a shift time point of the multi-stage transmission 100 based on the calculated driving force.

The controller 40 may perform a variety of controls required in a process of calculating a driving force of the drive motor DM when entering a downshift mode of the multi-stage transmission 100, and determining a time point at which the calculated driving force exceeds a reference value (e.g., zero) as a shift time point of the multi-stage transmission 100.

The controller 40 may perform a variety of controls required in a process of calculating a driving force of the drive motor DM when entering an upshift mode of the multi-stage transmission 100, and determining a time point at which the calculated driving force is less than a reference value (e.g., zero) as a shift time point of the multi-stage transmission 100.

Hereinafter, the operation of the controller 40 will be described in detail.

The controller 40 may detect a shift gear corresponding to a vehicle speed measured by the vehicle speed sensor 20 and a value measured by the APS 30 based on a transmission pattern map stored in the storage 10, and compare the detected shift gear with a current shift gear to determine whether to enter a shift mode.

The controller 40 may calculate a driving force of the drive motor DM when entering the shift mode of the multi-stage transmission 100. For example, the controller 40 may calculate a driving force dDF based on the following [Equation 1].

$$dDF = \frac{T_i(i_2 - i_1) \times i_{FGR}}{R_{Tire}} \qquad \text{[Equation 1]}$$

where $i_x$ denotes a gear ratio of the shift gear (x), $T_i$ is an input torque, $i_{FGR}$ denotes the final reduction gear ratio, and $R_{tire}$ denotes the tire's rolling radius. In this case, the gear ratio and the longitudinal reduction ratio of the shift gear and the rolling radius of the tire may be stored in the storage 10 as fixed values, and the input torque may be obtained through the vehicle network.

The controller 40 may calculate a driving force of the drive motor DM using the [Equation 1] when entering a downshift mode of the multi-stage transmission 100, and determine a time point at which the calculated driving force exceeds a reference value (e.g., zero) as a shift time point of the multi-stage transmission 100.

The controller 40 may calculate a driving force of the drive motor DM using the [Equation 1] when entering an upshift mode of the multi-stage transmission 100, and determine a time point at which the calculated driving force is less than the reference value (e.g., zero) as a shift time point of the multi-stage transmission 100.

Figure 6:
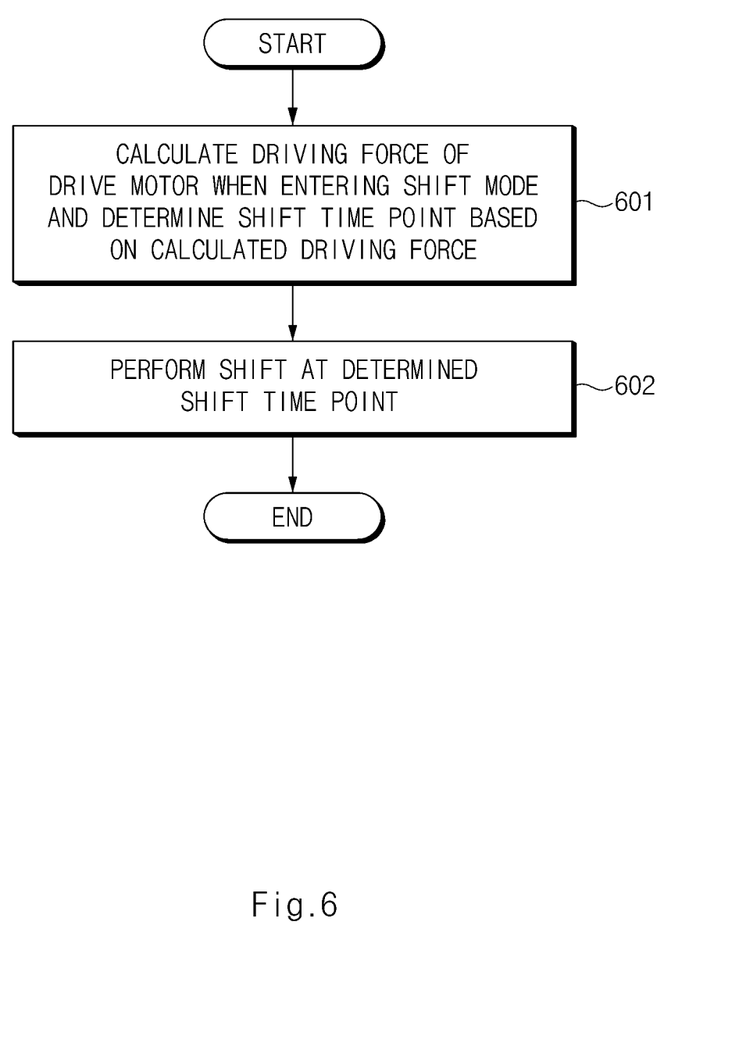
FIG. 6 is a flowchart of an embodiment of a control method of a multi-stage transmission for an electric vehicle according to an embodiment of the present disclosure.

FIG. 6 is a flowchart of an embodiment of a control method of a multi-stage transmission for an electric vehicle according to an embodiment of the present disclosure.

First, the controller 40 may calculate a driving force of a drive motor when entering a shift mode, and determine a shift time point based on the calculated driving force (601). In this case, the controller 40 may determine a time point at which the calculated driving force exceeds a reference value when entering a downshift mode as a shift time point of the multi-stage transmission, and determine a time point at which the calculated driving force is less than the reference value, as a shift time point of the multi-stage transmission when entering an upshift mode.

Thereafter, the multi-stage transmission may perform shifting at the determined shift time point (602).

Figure 7:
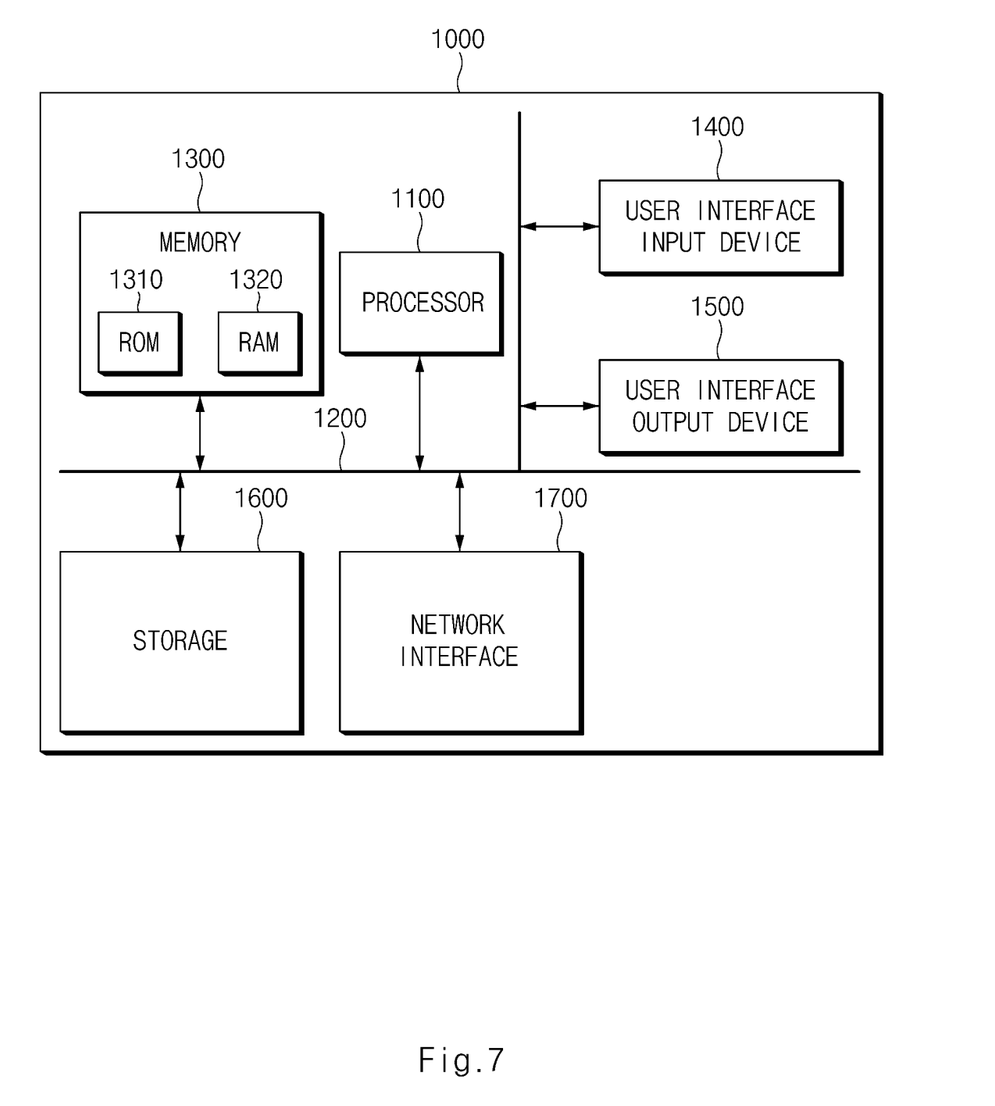
FIG. 7 is a block diagram showing a computing system for executing a method of controlling a multi-stage transmission for an electric vehicle according to an embodiment of the present disclosure.

FIG. 7 is a block diagram showing a computing system for executing a method of controlling a multi-stage transmission for an electric vehicle according to an embodiment of the present disclosure.

Referring to FIG. 7, a control method of a multi-stage transmission for an electric vehicle according to an embodiment of the present disclosure as described above may be also implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The control device and control method for a multi-stage transmission for an electric vehicle according to an embodiment of the present disclosure may calculate the driving force of the driving motor when entering the shift mode of the multi-stage transmission, and determine the shift time point of the multi-stage transmission based on the calculated driving force, thus securing feeling of stable shifting during upshift, and sufficient feeling of acceleration during downshift.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for an electric vehicle, the device comprising:
a controller configured to calculate a driving force of a drive motor when entering a shift mode and to determine a shift time point based on the calculated driving force; and
a multi-stage transmission configured to perform shifting at the determined shift time point.

2. The device of claim 1, wherein the controller is configured to determine a time point at which the calculated driving force exceeds a reference value as the shift time point of the multi-stage transmission when entering a downshift mode.

3. The device of claim 2, wherein the controller is configured to calculate the driving force (dDF) based on equation $$dDF = \frac{T_i(i_2 - i_1) \times i_{FGR}}{R_{Tire}},$$

where $i_x$ denotes a gear ratio of a shift gear (x), $T_i$ is an input torque, $i_{FGR}$ denotes a final reduction gear ratio, and $R_{tire}$ denotes a tire's rolling radius.

4. The device of claim 2, further comprising:
a storage configured to store a transmission pattern map of the multi-stage transmission;
a vehicle speed sensor configured to measure a speed of the electric vehicle; and
an accelerator position sensor (APS) configured to measure an amount of pressure on an accelerator pedal of the electric vehicle.

5. The device of claim 4, wherein the controller is configured to detect a shift gear corresponding to the speed measured by the vehicle speed sensor and the amount of pressure measured by the APS based on the transmission pattern map, and to compare the detected shift gear with a current shift gear to determine whether to enter the downshift mode.

6. The device of claim 1, wherein the controller is configured to determine the shift time point of the multi-stage transmission based on the calculated driving force when entering an upshift mode.

7. The device of claim 6, wherein the controller is configured to calculate the driving force (dDF) based on equation $$dDF = \frac{T_i(i_2 - i_1) \times i_{FGR}}{R_{Tire}},$$

where $i_x$ denotes a gear ratio of a shift gear (x), $T_i$ is an input torque, $i_{FGR}$ denotes a final reduction gear ratio, and $R_{tire}$ denotes a tire's rolling radius.

8. The device of claim 6, further comprising:
- a storage configured to store a transmission pattern map of the multi-stage transmission;
- a vehicle speed sensor configured to measure a speed of the electric vehicle; and
- an accelerator position sensor (APS) configured to measure an amount of pressure on an accelerator pedal of the electric vehicle.

9. The device of claim 8, wherein the controller is configured to detect a shift gear corresponding to the speed measured by the vehicle speed sensor and the amount of pressure measured by the APS based on the transmission pattern map, and to compare the detected shift gear with a current shift gear to determine whether to enter the upshift mode.

10. A control device for an electric vehicle, the control device comprising:
- a controller configured to calculate a driving force of a drive motor when entering a shift mode and to determine a shift time point based on the calculated driving force to instruct a multi-stage transmission to perform shifting at the determined shift time point.

11. The control device of claim 10, further comprising:
- a storage configured to store a transmission pattern map of the multi-stage transmission;
- a vehicle speed sensor configured to measure a speed of the electric vehicle; and
- an accelerator position sensor (APS) configured to measure an amount of pressure on an accelerator pedal of the electric vehicle;
- wherein the controller is further configured to determine a time point at which the calculated driving force exceeds a reference value as the shift time point of the multi-stage transmission when entering a downshift mode.

12. The control device of claim 11, wherein the controller is configured to detect a shift gear corresponding to the speed measured by the vehicle speed sensor and the amount of pressure measured by the APS based on the transmission pattern map, and to compare the detected shift gear with a current shift gear to determine whether to enter the downshift mode.

13. The control device of claim 10, wherein the controller is configured to determine the shift time point of the multi-stage transmission based on the calculated driving force when entering an upshift mode.

14. A control method of a multi-stage transmission for an electric vehicle, the control method comprising:
- calculating a driving force of a drive motor when entering a shift mode;
- determining a shift time point based on the calculated driving force; and
- performing shifting at the determined shift time point.

15. The control method of claim 14, wherein determining the shift time point includes determining a time point at which the calculated driving force exceeds a reference value as the shift time point of the multi-stage transmission when entering a downshift mode.

16. The control method of claim 15, wherein determining the shift time point includes calculating the driving force (dDF) based on equation $$dDF = \frac{T_i(i_2 - i_1) \times i_{FGR}}{R_{Tire}},$$

where $i_x$ denotes a gear ratio of a shift gear (x), $T_i$ is an input torque, $i_{FGR}$ denotes a final reduction gear ratio, and $R_{tire}$ denotes a tire's rolling radius.

17. The control method of claim 15, wherein determining the shift time point further includes:
- storing a transmission pattern map of the multi-stage transmission;
- measuring a speed of the electric vehicle;
- measuring an amount of pressure on an accelerator pedal of the electric vehicle;
- detecting a shift gear corresponding to the measured speed and the measured amount of pressure based on the transmission pattern map; and
- comparing the detected shift gear with a current shift gear to determine whether to enter the downshift mode.

18. The control method of claim 14, wherein determining the shift time point includes determining the shift time point of the multi-stage transmission based on the calculated driving force when entering an upshift mode.

19. The control method of claim 18, wherein determining the shift time point includes calculating the driving force (dDF) based on equation $$dDF = \frac{T_i(i_2 - i_1) \times i_{FGR}}{R_{Tire}},$$

where $i_x$ denotes a gear ratio of a shift gear (x), $T_i$ is an input torque, $i_{FGR}$ denotes a final reduction gear ratio, and $R_{tire}$ denotes a tire's rolling radius.

20. The control method of claim 18, wherein determining the shift time point further includes:
- storing a transmission pattern map of the multi-stage transmission;
- measuring a speed of the electric vehicle;
- measuring an amount of pressure on an accelerator pedal;
- detecting a shift gear corresponding to the measured speed and the measured amount of pressure based on the transmission pattern map; and
- comparing the detected shift gear with a current shift gear to determine whether to enter the upshift mode.

* * * * *